Figures 1, 2:
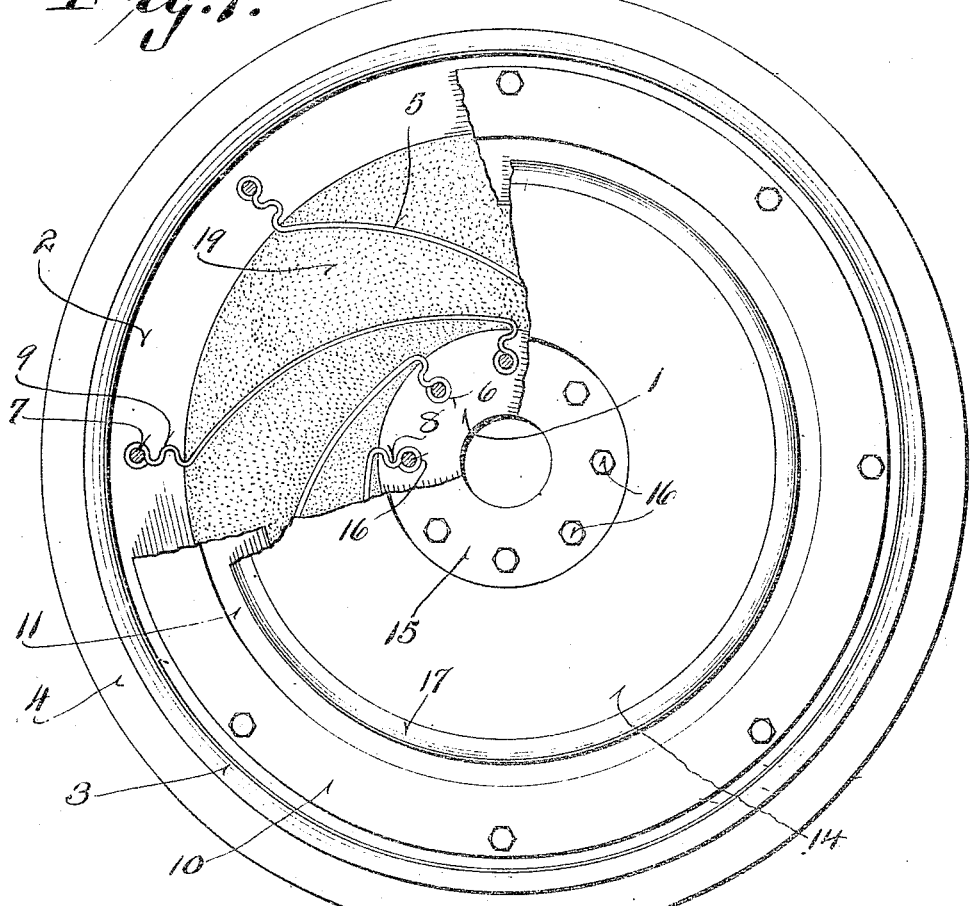

June 30, 1925.

J. H. SCHULZ 1,543,728

RESILIENT WHEEL

Filed March 17, 1924

Inventor
John H. Schulz

Patented June 30, 1925.

1,543,728

UNITED STATES PATENT OFFICE.

JOHN H. SCHULZ, OF MILWAUKEE, WISCONSIN.

RESILIENT WHEEL.

Application filed March 17, 1924. Serial No. 699,800.

*To all whom it may concern:*

Be it known that I, JOHN H. SCHULZ, a citizen of the United States, and resident of Milwaukee, in the county of Milwaukee and State of Wisconsin, have invented certain new and useful Improvements in Resilient Wheels; and I do hereby declare that the following is a full, clear, and exact description thereof.
This invention relates to resilient wheels.

Objects of this invention are to provide a resilient wheel which will cushion the shocks, which has elasticity in the body of the wheel, which is adequately braced and reinforced against lateral distortion, which on rebound will act in the nature of a snubber, and which is of attractive and pleasing appearance and may be readily produced at a minimum of expense.
An embodiment of the invention is shown in the accompanying drawing, in which:—

Figure 1 is a face view of the wheel with parts broken away to show the interior construction.
Figure 2 is an edge view of the wheel with a portion thereof in section.

The wheel comprises a hub 1 and a felly 2 which carries a rim 3. This rim is provided with any desired type of tire, but the wheel is preferably designed for using a solid rubber tire 4.

A plurality of slightly curved springs 5 join the hub and the felly. These springs are provided at their inner and outer ends with eyelet portions 6 and 7, respectively, which are joined to the body of the spring by means of crimped portions 8 and 9, respectively. The hub and felly are suitably slotted along curved lines corresponding to the crimps, and the springs are slid sidewise into position. The eyelet portions 6 and 7 of the springs provide sleeves for the securing bolts hereinafter described.

A pair of annular members are provided on each side of the felly and comprise an outer portion 10 and a depressed inner portion 11, such inner portion extending inwardly and terminating a little distance inwardly of the felly, as clearly shown in the drawings. Bolts 12 are passed through these flanges or annular members and extend through the eyelet portions 7 of the springs. If desired spacing sleeves 13 may be slipped into the apertures of the eyelets 7 to fill out the space to the edge of the felly as the springs 5 are of materially less width than the felly, as may be seen from Figure 2. A pair of metal disks 14 are positioned on opposite sides of the wheel and overlap the inwardly extending flange 11. These disks are preferably provided with a slightly depressed central portion 15 which is secured by means of bolts 16 to the hub 1. These bolts it will be noted, pass through the eyelet 6 and thus aid in securely attaching, not only the disks and hubs, but also the inner ends of the springs as well. The outer or peripheral edge of the disks are provided with a channel portion 17 which receives a packing 18 preferably impregnated with a lubricant.

A plurality of curved rubber sections 19 are fitted between successive springs and between the hub and the felly. These rubber sections are preferably provided with marginal flanges 20, as may be seen from Figure 2 which overlap the outer edges of the springs 5 and prevent contact of such springs with the disks 14.

These rubber sections or fillers materially strengthen the wheel and provided a body against which the springs may press under stress. In addition to this, the rubber sections act somewhat in the nature of snubbers and prevent sudden and excessive motion of the springs.

The packing 18 in the peripheral channels 17 of the side disks 14 prevents the entrance of grit and dirt into the interior of the wheel and in addition insures an adequate lubrication of the sliding portions of the device, thus preventing wear and noise. It will be seen that a resilient wheel has been provided which is of attractive appearance, which is of effective design, which is reinforced against lateral distortion and which will not only yield readily to shocks but will prevent excessive rebound.

Although the invention has been described in considerable detail, it is to be understood that the invention may be variously embodied and is, therefore, to be limited only as claimed.

I claim:

1. A resilient wheel for a vehicle comprising a felly and a hub, a plurality of bowed springs having their ends secured to said hub and said felly, a plurality of curved and tapered rubber blocks completely filling the space between successive springs and between said hub and said felly, a pair of annular members secured to said felly, and a pair of disks closing the space between said hub and felly and slidably related to said annular members.

2. A resilient wheel for vehicles comprising a plurality of bow shaped spring spokes embedded in a yielding resilient material, a hub to which the inner ends of the springs are attached, a felly to which the outer ends of the springs are attached, said hub and felly defining an annular space therebetween for retaining the resilient material, a pair of disks closing the space between the hub and the felly, said disks having annular marginal channels adapted to receive a packing, and a pair of annular flanges secured to said felly and against which said disks rub.

3. A resilient wheel comprising a felly and a hub, a plurality of bowed springs having crimped ends provided with eyelets interposed between said felly and hub with the eyelets and the crimped portions fitted within the felly and hub, a pair of flanges positioned on opposite sides of said felly, bolts passing through said flanges and said eyelets, a pair of disks overlapping said flanges and positioned upon opposite sides of said hub, and a plurality of bolts passing through said disks, the inner eyelets of said springs, and said hub.

4. A resilient wheel comprising a hub and a felly provided with a tire receiving rim, a plurality of bowed springs having crimped eyeletted ends secured within said hub and felly, annular flanged members positioned on opposite sides of said felly and extending inwardly thereof, a plurality of bolts passing through said felly and eyelet portions of said springs, a pair of disks positioned upon opposite sides of said hub, bolts passing through said disks and the inner eyelets of said springs, and a plurality of rubber sections curved to fit said hub, said felly and said springs, said sections being interposed between succesive springs.

In testimony that I claim the foregoing I have hereunto set my hand at Milwaukee, in the county of Milwaukee and State of Wisconsin.

JOHN H. SCHULZ